G. BEY.
ROTARY PUMP.
APPLICATION FILED SEPT. 5, 1917.

1,276,615.

Patented Aug. 20, 1918.
2 SHEETS—SHEET 1.

WITNESSES
Geo N Naylor
A. L. Kitchin.

INVENTOR
George Bey
BY Munn & Co.
ATTORNEYS

G. BEY.
ROTARY PUMP.
APPLICATION FILED SEPT. 5, 1917.

1,276,615.

Patented Aug. 20, 1918.
2 SHEETS—SHEET 2.

WITNESSES

INVENTOR
George Bey
BY
ATTORNEYS

UNITED STATES PATENT OFFICE.

GEORGE BEY, OF JERSEY CITY, NEW JERSEY.

ROTARY PUMP.

1,276,615.  Specification of Letters Patent.  Patented Aug. 20, 1918.

Application filed September 5, 1917. Serial No. 189,718.

*To all whom it may concern:*

Be it known that I, GEORGE BEY, a citizen of the United States, and a resident of Jersey City, in the county of Hudson and State of New Jersey, have invented a new and Improved Rotary Pump, of which the following is a full, clear, and exact description.

This invention relates to pumps and particularly to an improved rotary pump, and has for an object the provision of an improved construction in which leakage is prevented by use of gaskets without in any way retarding or preventing the proper operation of the piston.

Another object in view is to provide a pump having a rotary piston alternately discharging and drawing in liquid at the opposite ends of the structure.

A further object of the invention is to form a rotary pump in such a manner that the casing, piston and associated parts form a valve mechanism automatically, whereby extra valves are not required to prevent any back flow of any material being pumped.

Figure 1:
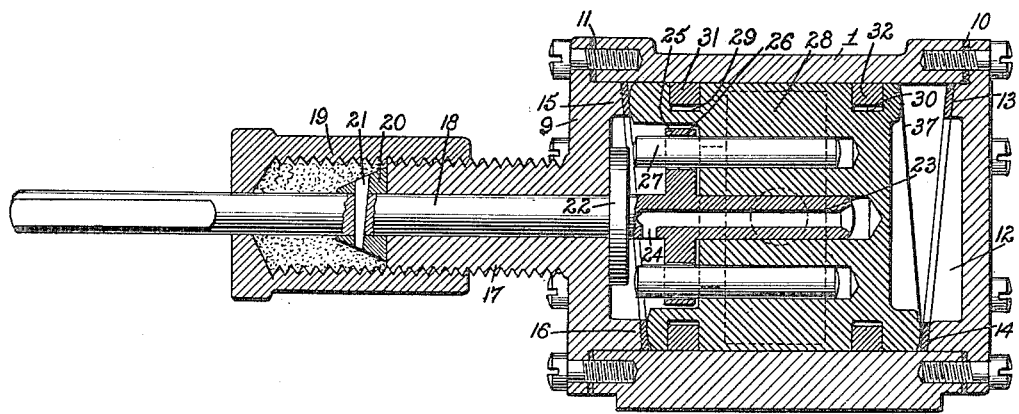
Figure 1 is a longitudinal vertical section through a pump disclosing an embodiment of the invention.
Figure 3:
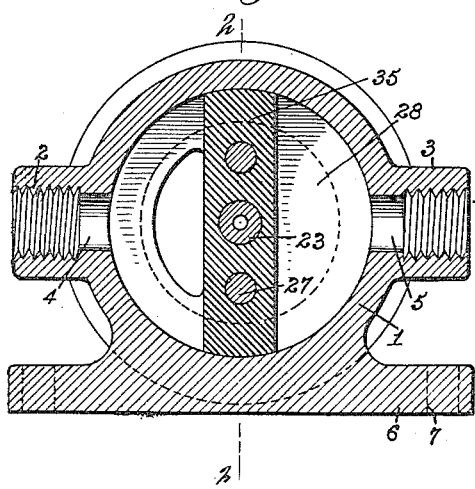
Fig. 3 is a section through Fig. 2 on line 3—3.
Figure 2:
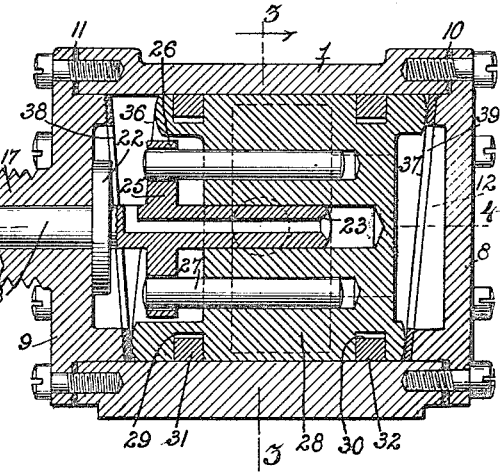
Fig. 2 is a view similar to Fig. 1 but showing the piston turned a half revolution, the same being taken through Fig. 3 approximately on line 2—2.

Referring to the accompanying drawings by numerals, 1 indicates a casing formed of metal of any desired kind and provided with interiorly threaded enlargements or bosses 2 and 3. The interior bores of said enlargements merge into the inlet opening 4 and the outlet opening 5. The casing is preferably constructed with a base 6 designed to receive suitable securing bolts or other securing members through the opening 7. In addition, the casing 1 is preferably formed open at the ends so as to receive the heads 8 and 9, said heads being secured in place by any suitable means, as for instance, screws, and prevented from leaking by reason of the gaskets 10 and 11 formed of any suitable material, as for instance, lead. The head 8 is provided with a cam 12 which is lowest at point 13 and highest at point 14, said cam being circular when looking at the same from the front. Head 9 is provided with a similar cam 15 arranged as shown particularly in Fig. 1, whereby the high point 16 of the cam is opposite the high point 14 of cam 12. Head 9 is also provided with a hollow threaded extension 17 which accommodates the power shaft 18 and the packing gland 19.

Arranged within the gland 19 is a stop 20 held in place by a suitable beveled key 21 extending through the shaft 18 so that the shaft cannot move in one direction, said shaft being prevented from movement in the opposite direction by the enlargement 22 preferably formed integral with the shaft. By the provision of the enlargement 22 and the stop 20 shaft 18 may freely rotate but cannot move longitudinally. The inner end of the shaft 18 extends into the casing 1 preferably centrally thereof, said inner end being provided with a tubular section 23 having an opening 24, and with an enlargement 25 formed with a plurality of apertures 26 for accommodating the ends of the pins 27 fitting into the piston 28. These pins may be held in piston 28 by snugly fitting the apertures in said piston or may be held in by suitable threads or other means, as desired, while they are allowed to freely slide in the apertures 26 of member 25. This construction is provided in order that power may be readily transmitted to piston 28 from the shaft 18 and rotating said piston for allowing at the same time a back and forth movement thereof during the operation of the pump.

Figure 6:
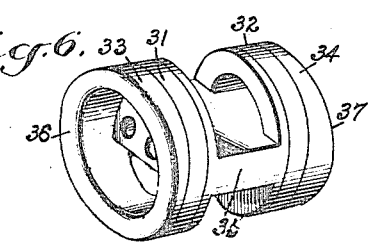
Fig. 6 is a perspective view of the piston.
Figure 4:
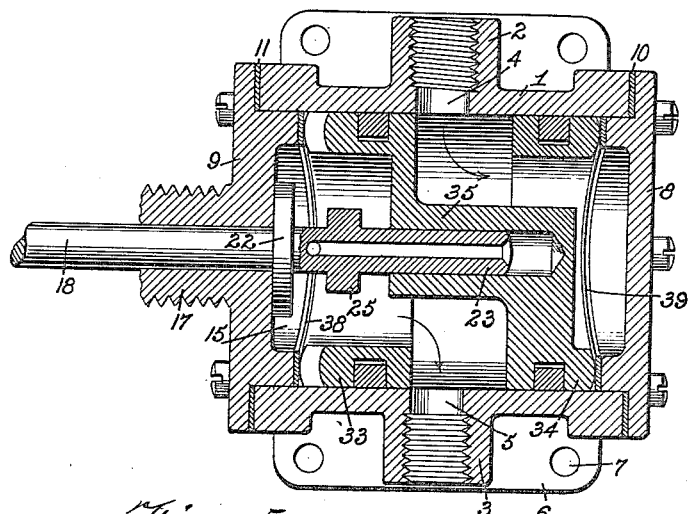
Fig. 4 is a section through Fig. 2 on line 4—4.
Figure 5:
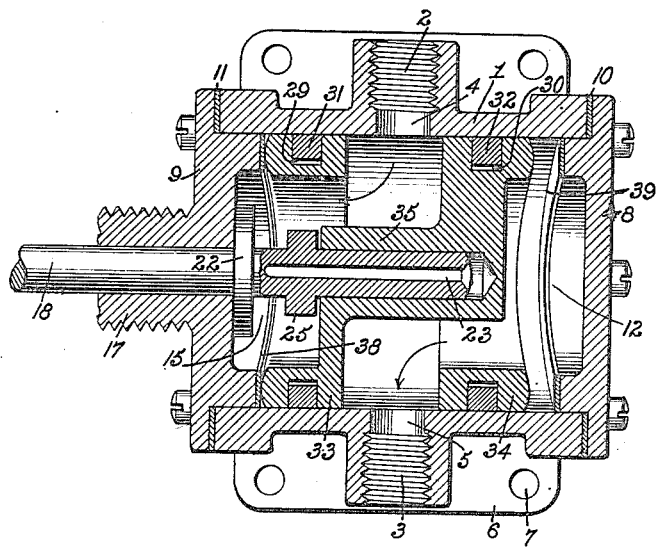
Fig. 5 is a sectional view similar to Fig. 4 but with the piston turned a half revolution.

The piston 28 is made to fit casing 1 with a reasonable clearance, but in order to prevent any leakage said piston is provided with packing ring grooves 29 and 30 for receiving the packing rings 31 and 32. From Fig. 6 it will be observed that the piston in general appearance discloses two rings 33 and 34 connected by a central web or blade 35 which coacts with the cams 12 and 15 and the cam faces 36 and 37 on the piston 28 so as to continually separate the inlet from the outlet and maintain the pressure on the fluid as it flows out while causing a suction on the fluid entering the pump. In order to cause the piston to operate more easily and without noise rings 38 and 39, preferably of metal, are provided between the cam faces of the piston and the cams 12 and 15. Also, in order to more evenly balance and provide a more easily operated structure, the fluid entering one end of the piston is permitted to pass through passageway 24 and from thence into the tubular part 23 of shaft 18.

It will be noted that during the rotation of the piston the same is moved back and forth by the action of the cams so that the alternate ends are opened to the inlet and outlet openings 4 and 5 whereby when one end is in communication with inlet 41 the same is filled with the fluid being pumped while the other end is discharging. A half revolution of the piston reverses this action, and so on during the continuous operation of the pump. By providing a piston discharge of this nature and a gradual opening for the incoming fluid, the outgoing fluid is positively forced out of the pump and the incoming fluid is drawn or sucked into the pump, thus producing a force pump without check valves or, in fact, valves of any kind, as the piston itself, coacting with the casing and the heads, takes the place of valves during the rotation of the piston. It will be noted that by reason of this construction the pump may be reversed at any time and in that event the inlet would become the outlet and the outlet would become the inlet.

What I claim is:

1. A rotary pump, comprising a casing formed with an inlet and an outlet, said inlet and outlet being on opposite sides of the casing, means forming heads for said casing, said means having oppositely facing cams, a piston arranged in said casing having parallel arranged cams coacting with the first mentioned cams and diametrically arranged openings merging into the opposite ends of the piston, the part of the piston between said openings acting as a valve for said inlet and said outlet and means for rotating said piston, said means permitting a back and forth movement under the action of said cams.

2. A rotary pump, comprising a casing having an inlet and an outlet and heads formed with cams having circular faces arranged at an angle, said faces being so positioned that the angle thereof will be in opposition, a rotatable piston acting as valves for said inlet and said outlet arranged between said heads and provided with parallel inclined faces coacting with the faces of said cams, a sliding member connected with said piston, and a power member having an opening for receiving said sliding member whereby as the power member is rotated the piston will also be rotated and reciprocated according to the action of said cams.

3. A rotary pump, comprising a casing provided with inlet and outlet openings and end members having cams with inclined faces inclined in opposite directions a power member extending into said casing, and a piston rotated by said power member, said piston being formed with parallel diametrically arranged faces, an opening extending from each face axially to near the center of the piston, said openings being spaced apart, and a radial opening extending from each of the first mentioned openings, said radial openings engaging with said inlet and outlet openings respectively during the rotation of the piston end.

4. A rotary pump, comprising a casing provided with an inlet and outlet on diametrically opposite sides, a piston formed with disk-shaped members at each end and a connecting web, said web extending from one side of the piston to the other and acting as valves for said inlet and said outlet, and disks having apertures extending therethrough, said apertures being arranged on opposite sides of said web whereby the opposite sides of the web are in communication with the inlet and outlet respectively, and cam members arranged on the ends of the casing in communication with said apertures, said cam members causing a back and forth longitudinal movement of the piston during its rotary movement whereby the fluid taken in the inlet will be forced out of the outlet.

5. A valveless force pump, comprising a casing having an inlet and outlet on diametrically opposite sides, a head at each end of said casing formed with oppositely inclined cams, a power member extending into said casing, and a piston connected with said power member and rotated thereby, said connection permitting a longitudinal movement of the piston, said piston being formed with inclined parallel ends coacting with said cams with a segmental notch on each side centrally and an opening for each notch, the opening for one notch providing a communication with one end of the piston and the other opening providing a communication with the other end of the piston whereby matter is drawn in through said inlet opening and forced out of said outlet opening.

6. In a pump of the character described, a casing provided with inlet and outlet openings, oppositely inclined cams arranged at the opposite ends of the casing, a rotary piston arranged in the casing and provided with inclined parallel ends, said ends mating with said cams when in a predetermined position, and means for rotating said piston so as to cause the ends to alternately engage said cams for forcing the fluid alternately from the opposite ends of the casing through said outlet, said piston being formed with a plurality of passageways, one of said passageways extending to one end of the piston from the periphery of the piston and the other passageway extending from the periphery of the piston to the opposite end thereof.

7. In a rotary pump of the character described, a casing provided with inlet and outlet openings, an inclined cam arranged at each end of the casing interiorly thereof, said cams being inclined in opposite directions so that the widest point between the cams will be diametrically opposite the narrowest point between the cams, a piston having inclined ends, said piston being of a length to snugly fit between the space provided at the nearest point between said cams, whereby when the piston is rotated the matter at the respective ends of the casing will be forced therefrom, said piston being provided with narrow passageways, one passageway extending from one end to the periphery and the other from the opposite end to the periphery, and means for rotating said piston, said means being provided with members transmitting power to the piston and allowing a longitudinal movement thereof.

GEORGE BEY.